Patented Oct. 28, 1941

2,260,470

UNITED STATES PATENT OFFICE 2,260,470

TREATMENT OF AGAVE FIBERS AND RESIDUES AND THE LIKE

Jack May, London, England, assignor to Avex Limited, London, England, a British company No Drawing. Application June 21, 1939, Serial No. 280,401. In Great Britain June 27, 1938

16 Claims. (Cl. 252—316)

This invention relates to the chemical treatment of vegetable material, and more particularly to the treatment of tissues of sisal and kindred plants, such as Sanseviera and plants of the Agave family, such as American aloe, and Henequen. The invention is particularly concerned with the treatment of leaf residues consisting of pulp and dried organic tissues of these plants which remain after the commercial fiber has been separated by decortication and other mechanical means, but the invention may be applied to fibers to which some pulp is adhering or to leaf liquors of the plants or organic residues thereof.

Probably the most important plant in this connection is the sisal, and in this connection the invention is valuable in the treatment of dried sisal pulp recovered from the washing water of mechanical decorticators, drained and sun-dried.

According the the present invention, the organic compounds present in the fibrous structure of the above-mentioned plants are treated with a soluble salt of phosphoric acid. Naturally for commercial reasons, the sodium phosphates are the salts which are likely to be used in practice.

The invention may in particular be carried out by the use of tri-sodium phosphate and also the soluble sodium hexameta-phosphate, tetra sodium pyrophosphate, di-sodium hydrogen-phosphate or sodium tri-polyphosphate ($Na_5P_3O_{10}$). Yet again mixtures of phosphates may be employed; for instance, the commercial product containing about 80 per cent sodium hexa-metaphosphate and the remainder sodium tri-polyphosphate. The selection of a particular phosphate depends mainly on the use to which the products are to be put. When tri-sodium phosphate is used, for example, the extracting solution is more or less alkaline and the product is useful for the clarification of water. When hexametaphosphate is used the extract is particularly useful for absorbing oxygen from water. Again, when the extracts are wanted for edible products, hair oil, or for use as the basis of cosmetics and ointments, it is convenient to use the neutral pyrophosphate as the extracting agent. The gels resulting from the process may be used as emulsifying agents, for example, in the production of emulsions of oils in water.

The treatment when sodium hexametaphosphate, sodium pyrophosphate or di-sodium hydrogen phosphate is used is much the same is in the case of tri-sodium phosphate, except that in these cases boiling is essential. Generally speaking, if the reaction is carried out under acid conditions, the mass will set to a jelly, which will break up on standing, the time required depending upon the temperature under which the extraction is carried out, and the mass can be dehydrated in any usual manner. If a phosphate which causes an alkaline reaction is used, or if alkali is added to keep the reaction alkaline, gel formation is prevented in the liquor obtained from the extraction, providing the aqueous content is not less than about 40 parts of water to 4 parts by weight of the material being treated and one part of the phosphate. However, upon filtration or dehydration, or both, a finely divided colloidal product having a creamy texture is produced. However, the product can be precipitated from the solution by the addition of mineral acid or alcohol, and it will gel if organic acids are added. The product can be precipitated in a finely divided state of creamy consistency by the addition of hypochlorites. Gel formation may be effected, for example, by means of a very weak solution of calcium chloride, in fact the amount of calcium chloride in ordinary London water, which amounts to 3.1 grains per gallon, is sufficient. Thus, on adding the solution to such water, a fine gel is formed, which will take down with it any solids in the water. A weak solution of magnesium chloride or sodium chloride may also be used with similar results. Gels of varying consistencies may be obtained by varying the proportions of the chloride used to the extraction treated.

In order that the invention may be more clearly understood and readily carried into effect, some methods of operation in accordance therewith will now be described, purely by way of example, in somewhat greater detail.

*Example 1*

The dried sisal pulp already referred to is ground to pass a mesh of 0.25 millimetre. One part by weight of tri-sodium phosphate is dissolved in 40 parts of water, which is soft, and if London water is used it should be softened to 0.5 degree hardness in a zeolite base exchange softener. 4 parts by weight of the ground sisal dust are added, and the mixture is either boiled for a few minutes, say for ten minutes, at atmospheric pressure, or allowed to stand for eight hours at a temperature of 80° C. The resulting liquor is drained and filtered. If it is to be kept, it is necessary to add 1% of formaldehyde or other suitable preservative. Under these conditions, the reaction is slightly alkaline, but the product may be precipitated as indicated above by acids or alcohol or gels formed by the use of a dilute solution of calcium, magnesium or sodium chloride.

Example 2

If one part by weight of sodium hexametaphosphate is used instead of the tri-sodium phosphate referred to in Example 1, and the other conditions are the same as in Example 1, a stiff gel results immediately on cooling which remains stable to solutions of hydrogen-peroxide, but breaks up on standing for 48 hours. The resulting solid may be dehydrated by kieselguhr, or in filter pots or presses.

Example 3

If one part by weight of sodium pyrophosphate is used instead of the tri-sodium phosphate referred to in Example 1, the reaction is otherwise carried out as in Example 1; the solution is neutral, and after filtration, gels upon standing for 24 hours, unless stabilised with a germicide or kept under sterilised conditions.

Example 4

If the process is carried out as in Example 1, except that one part by weight of di-sodium hydrogen phosphate is used, a stiff gel is formed but it breaks down rapidly unless stabilised.

The dehydrated and dried films or the precipitates formed with hypochlorite as mentioned above, are soluble in hot, soft or distilled water, but it is found that the resulting solutions are apt to deteriorate.

Instead of applying the treatment to dried sisal pulp removed from the leaf, as already indicated, it may be used for the treatment of leaves which have been pressed and where some pulp remains adherent to the fibers. In this case, the pulp is treated, as already described, and the extracted product is removed from the fibrous tissues by washing. The leaves as freshly cut may be pressed between rollers to expel as much of the liquids as possible and to break up the epidermis without damaging the fiber; then the fibrous portion is immersed in tanks in a treating solution to which the phosphate is added from time to time and the solution is maintained just alkaline to litmus. The treatment is carried on until a clear jelly has formed on the fibers and is then rinsed off, separated from the rinse water by filtration and evaporated to dryness.

I claim:

1. A process for the preparation of a valuable colloidal product which comprises extracting the residues resulting from the separation of fibers from the leaves of plants selected from the group consisting of plants of the Agave family and Sanseveria with an aqueous solution of a water soluble salt of phosphoric acid, and recovering colloidal constituents from the resultant extract.

2. A process for the preparation of a valuable colloidal product which comprises extracting the residues resulting from the separation of fibers from the leaves of plants selected from the group consisting of plants of the Agave family and Sanseveria with an aqueous solution of trisodium phosphate and recovering colloidal constituents from the resultant extract.

3. A process for the preparation of a valuable colloidal product which comprises extracting the residues resulting from the separation of fibers from the leaves of plants selected from the group consisting of plants of the Agave family and Sanseveria with an aqueous solution of sodium hexametaphosphate, and recovering colloidal constituents from the resultant extract.

4. A process for the preparation of a valuable colloidal product which comprises extracting the residues resulting from the separation of fibers from the leaves of plants selected from the group consisting of plants of the Agave family and Sanseveria with an aqueous solution of sodium pyrophosphate, and recovering colloidal constituents from the resultant extract.

5. A process for the preparation of a valuable colloidal product which comprises extracting dried sisal pulp resulting from the separation of fibers from the leaves of sisal plants with an aqueous solution of sodium phosphate and recovering colloidal constituents from the resultant extract.

6. A process for the preparation of a valuable colloidal product which comprises extracting the residues resulting from the separation of fibers from the leaves of plants selected from the group consisting of plants of the Agave family and Sanseveria with an aqueous solution of water soluble salt of phosphoric acid, and treating the resultant extract with a water-soluble chloride to precipitate colloidal constituents from the resultant extract.

7. A process for the preparation of a valuable colloidal product which comprises extracting the residues resulting from the separation of fibers from the leaves of plants selected from the group consisting of plants of the Agave family and Sanseveria with an aqueous solution of a water soluble salt of phosphoric acid, and treating the resultant extract with a water-soluble chloride selected from the group consisting of alkali and alkaline earth metal chlorides to precipitate colloidal constituents from the resultant extract.

8. A process for the preparation of a valuable colloidal product which comprises extracting the residues resulting from the separation of fibers from the leaves of plants selected from the group consisting of plants of the Agave family and Sanseveria with an aqueous solution of a water soluble salt of phosphoric acid, and treating the resultant extract with calcium chloride to precipitate colloidal constituents from the resultant extract.

9. A process for the preparation of a valuable colloidal product which comprises extracting the residues resulting from the separation of fibers from the leaves of plants selected from the group consisting of plants of the Agave family and Sanseveria with an aqueous solution of a water soluble salt of phosphoric acid, and treating the resultant extract with an acid to precipitate colloidal constituents from the resultant extract.

10. A process for the preparation of a valuable colloidal product which comprises extracting the residues resulting from the separation of fibers from the leaves of plants selected from the group consisting of plants of the Agave family and Sanseveria with an aqueous solution of a water soluble salt of phosphoric acid, and treating the resultant extract with a water-soluble hypochlorite to precipitate colloidal constituents from the resultant extract.

11. A process for the preparation of a valuable colloidal product which comprises extracting dried sisal pulp resulting from the separation of fibers from the leaves of sisal plants with an aqueous solution of a water soluble salt of phosphoric acid, maintaining the resulting liquor slightly alkaline to litmus, and precipitating colloidal constituents from the resultant extract.

12. A process for the preparation of a valuable colloidal product which comprises extracting dried sisal pulp resulting from the separation of fibers from the leaves of sisal plants with an extraction agent consisting of water and an amount of trisodium phosphate dissolved therein just sufficient to render the mass alkaline, and recovering colloidal constituents from the resultant extract.

13. A process for the preparation of a valuable colloidal product which comprises extracting dried sisal pulp resulting from the separation of fibers from the leaves of sisal plants with an aqueous solution of sodium hexametaphosphate and recovering colloidal constituents from the resultant extract.

14. As a new composition of matter a valuable colloidal constituent recovered from an extract obtained from an extraction of the residues resulting from the separation of fibers from the leaves of plants selected from the group consisitng of the Agave family and Sanseveria with an aqueous solution of a water soluble salt of phosphoric acid.

15. As a new composition of matter a valuable colloidal constituent recovered from an extract obtained from an extraction of dried sisal pulp resulting from the separation of fibers from the leaves of sisal plants with an aqueous solution of a sodium phosphate.

16. As a new composition of matter a valuable colloidal gel recovered from an extract obtained from an extraction of the residues resulting from the separation of fibers from the leaves of plants selected from the group consisting of the Agave family and Sanseveria with an aqueous solution of a water soluble salt of phosphoric acid.

JACK MAY.